US009443021B2

(12) United States Patent
Chandra et al.

(10) Patent No.: US 9,443,021 B2
(45) Date of Patent: Sep. 13, 2016

(54) ENTITY BASED SEARCH AND RESOLUTION

(75) Inventors: Ashok K Chandra, Saratoga, CA (US); Olivier Jerzy Dabrowski, Gilroy, CA (US); David James Gemmell, Danville, CA (US); Benjamin Rubinstein, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/341,284

(22) Filed: Dec. 30, 2011

(65) Prior Publication Data

US 2013/0173639 A1 Jul. 4, 2013

(51) Int. Cl.
*G06F 17/30* (2006.01)
*H04L 29/08* (2006.01)

(52) U.S. Cl.
CPC ... *G06F 17/30867* (2013.01); *G06F 17/30864* (2013.01); *G06F 17/3064* (2013.01); *H04L 67/02* (2013.01)

(58) Field of Classification Search
CPC .................. G06F 17/30864; G06F 17/30867; G06F 17/3064; G06F 17/3071
USPC ................................. 707/736, 748, 752, 754
See application file for complete search history.

(56) References Cited

U.S. PATENT DOCUMENTS

| | | | |
|---|---|---|---|
| 6,112,202 A * | 8/2000 | Kleinberg | |
| 8,145,623 B1 * | 3/2012 | Mehta | G06F 17/3064 707/713 |
| 8,219,557 B2 * | 7/2012 | Grefenstette | G06F 17/30867 707/736 |
| 8,843,466 B1 * | 9/2014 | Zeiger | G06F 17/30 707/706 |
| 8,856,099 B1 * | 10/2014 | Lasko | G06F 7/00 707/706 |
| 9,317,613 B2 * | 4/2016 | Selvaraj | G06F 17/30867 |
| 2003/0233224 A1 * | 12/2003 | Marchisio | G06F 17/271 704/4 |
| 2005/0192946 A1 | 9/2005 | Lu et al. | |
| 2007/0038608 A1 | 2/2007 | Chen | |

(Continued)

FOREIGN PATENT DOCUMENTS

| | | |
|---|---|---|
| CN | 101506803 A | 8/2009 |
| WO | 2005065359 A2 | 7/2005 |

OTHER PUBLICATIONS

Agrawal, et al., "Exploiting Web Search Engines to Search Structured Databases", In Proceedings of the 18th International Conference on World Wide Web, Apr. 20-24, 2009, 10 pages.

(Continued)

*Primary Examiner* — Merilyn Nguyen
(74) *Attorney, Agent, or Firm* — Steven Spellman; Tom Wong; Micky Minhas

(57) ABSTRACT

Systems, methods, and computer-readable storage media for providing a rich search experience utilizing entity-type characterization are provided. A search query is received and an entity type is determined for the query. A Web search is then performed for the query against a predefined list of sources determined to be authoritative for the determined entity type. The results of the source-specific searches are filtered based upon the entity type providing a filtered list of results that each pertains to an entity of the entity type determined to be associated with the query. The filtered list are then compared to a list of resolved entities to determine equivalent entities identified by different searched sources, the equivalent entities being combined into a single potential search result. The consolidated search results are then ordered based upon rank values. At least a portion of the results may then be presented to the user.

11 Claims, 11 Drawing Sheets

(56) References Cited

U.S. PATENT DOCUMENTS

| | | | |
|---|---|---|---|
| 2007/0043723 A1 | 2/2007 | Bitan et al. | |
| 2007/0208724 A1 | 9/2007 | Madhavan et al. | |
| 2007/0244862 A1 | 10/2007 | Adams et al. | |
| 2008/0005076 A1 | 1/2008 | Payne et al. | |
| 2008/0133585 A1* | 6/2008 | Vogel et al. | 707/102 |
| 2008/0306908 A1 | 12/2008 | Agrawal et al. | |
| 2009/0083262 A1 | 3/2009 | Chang et al. | |
| 2009/0100049 A1 | 4/2009 | Cao | |
| 2009/0254527 A1 | 10/2009 | Jung et al. | |
| 2010/0293179 A1 | 11/2010 | Chaudhuri et al. | |
| 2011/0078136 A1 | 3/2011 | Ronen et al. | |
| 2011/0246456 A1* | 10/2011 | Weitz | G06F 17/30864 707/724 |
| 2011/0307432 A1* | 12/2011 | Yao et al. | 706/25 |
| 2012/0011587 A1* | 1/2012 | Byrne | G06F 21/6218 726/21 |
| 2012/0136853 A1* | 5/2012 | Kennedy et al. | 707/723 |
| 2013/0117310 A1* | 5/2013 | Chai et al. | 707/774 |

OTHER PUBLICATIONS

Cheng, et al., "Supporting Entity Search: A Large-Scale Prototype Search Engine", In Proceedings of the ACM SIGMOD International Conference on Management of Data, Jun. 11-14, 2007, pp. 1144-1146.

Notification of Transmittal of the International Search Report and the Written Opinion of the International Searching Authority, or the Declaration in PCT/US12/70430 mailed Apr. 16, 2013, 9 pages.

"First Office Action and Search Report Issued in Chinese Patent Application No. 201210585004.1", Mailed Date: May 6, 2015, 21 Pages.

* cited by examiner

300

WEB IMAGES VIDEOS SHOPPING NEWS MAPS MORE | MSN HOTMAIL

SITE:WWW.ALLROVI.COM IN SPACE NO ONE CAN HEAR 🔍

WEB

| WEB | IMAGES | VIDEOS | MOVIES ▾ |

RELATED SEARCHES   ALL RESULTS                                                                  1-4 OF 4 RESULTS

ALIEN
ALIEN FILMS              ALIEN – CAST, REVIEWS, SUMMARY, AND AWARDS - ALLROVI
ALIEN ORIGINS            MOVIE – ALIEN – 1979 – STARRING: TOM SKERITT, SIGOURNEY WEAVER –
ALIEN MOVIE WIKI         SYNOPSIS: "IN SPACE, NO ONE CAN HEAR YOU SCREAM" A CLOSE...
ALIEN RIDLEY SCOTT       WWW.ALLROVI.COM/MOVIES/MOVIE/ALIEN-V1503?R=ALLMOVIE
ALIEN MOVIE
SOUNDTRACK               ALIEN – CAST, REVIEWS, SUMMARY, AND AWARDS - ALLROVI
ALIEN MOVIE              FIND CAST, REVIEWS, SUMMARY AND AWARD INFORMATION FOR ALIEN ON
PICTURES ART             ALLROVI.COM. – 1979 – TOM SKERRITT – "IN SPACE, NO ONE CAN HEAR...
OCTOBER 26TH DVD         WWW.ALLROVI.COM/MOVIES/MOVIE/ALIEN-V1503
RELEASES
                         SEARCH RESULTS FOR "ALIEN"
                         "IN SPACE, NO ONE CAN HEAR YOU SCREAM." A CLOSE ENCOUNTER FO THE
                         THIRD KIND BECOMES A JAWS-STYLE NIGHTMARE WHEN AN ...
                         WWW.ALLROVI.COM/SEARCH/ALIEN?R=ALLMOVIE – CACHED PAGE

ALIEN [FRENCH] [BLUE-RAY] – BLU-RAY - ALLROVI
                         "IN SPACE, NO ONE CAN HEAR YOU SCREAM." A CLOSE ENCOUNTER FO THE
                         THIRD KIND BECOMES A JAWS-STYLE NIGHTMARE WHEN AN ...
                         WWW.ALLROVI.COM/MOVIES/MOVIE/RELEASE/ALIEN-FRENCH-BLU-RAY

RELATED SEARCHES FOR SITE:WWW.ALLROVI.COM IN SPACE NO ONE CAN
                         ALIEN                    ALIEN FILMS
                         ALIEN ORIGINS            ALIEN MOVIE WIKI
                         ALIEN RIDLEY SCOTT       ALIEN MOVIE SOUNDTRACK
                         ALIEN MOVIE PICTURE ART  OCTOBER 26TH DVD RELEASES

SITE:WWW.ALLROVI.COM IN SPACE NO ONE CAN HEAR 🔍

| | THERE CAN BE ONLY ONE | 🔍 |

WEB | WEB | IMAGES | VIDEOS | MOVIES ▼

ALL RESULTS                                   6 RESULTS
HIGH CONFIDENCE RESULTS

HIGHLANDER (1986)

R – FANTASY – 2H 00

SYNOPSIS: WITH THE ULTIMATE THROW-DOWN – "THERE CAN BE ONLY ONE" -- HIGHLANDER CAPTURED THE IMAGINATIONS OF FANTASY FANS SEEKING A WELL-EXECUTED SWORDPLAY...

RANK: 200.10

☐ NETFLIX
☐ HULU
☐ FLIXSTER
☐ COMMON
☐ IMDB

THE MATRIX (1999)

R – SCIENCE FICTION – 2H 16

SYNOPSIS: WHAT IF VIRTUAL REALITY WASN'T JUST FOR FUN, BUT WAS BEING USED TO IMPRISON YOU? THAT'S THE DILEMMA THAT FACES MILD-MANNERED COMPUTER JOCKEY...

RANK: 84.25

☐ MSN
☐ NETFLIX
☐ ITUNES
☐ YAHOO!
☐ MOVIETIX
☐ METACRIT
☐ IMDB
☐ FLIXSTER
☐ COMMON
☐ ZUNE

THE PRINCESS BRIDE (1987)

PG – ADVENTURE, CHILDREN'S/FAMILY – 1H 38

☐ METACRIT
☐ NETFLIX
☐ ITUNES

ENTITY BASED SEARCH AND RESOLUTION

BACKGROUND

Given a search query string, Web search engines have traditionally returned a list of hyperlinks that, upon selection, link to pages on the Web deemed relevant to the input search query. More recently, search engine results pages often also include richer content, usually via vertical information domains. As this trend continues, search will converge to a point where indexing and retrieval of information is performed not only with respect to Web pages but also with respect to abstract entities such as applications (for instance, from application marketplaces), movies, television shows, people, celebrities, events, cities, restaurants, theaters, companies, and the like. To surface entities, search engines must crawl multiple unstructured Web pages and/or subscribe to structured feeds regarding a particular entity type, resolve instances of an entity across this multi-source data, and surface a representation of the (merged) entity when a user's intent refers to the entity and/or its entity type. The complications associated with indexing and searching entities is compounded by the need to retrieve entities based on approximate descriptions, to retrieve broad sets of entities—some of which may not be described directly by the query string, to retrieve meta-data on an entity from a popular source based on its description in an unpopular source, in general to combine the features and ranks of indexed entities across multiple sources, to perform faceted search over entities, and in general to perform integrated search by integrating information from multiple web pages into a composite whole.

Prior art solutions to the entity search problem can be categorized into one of two approaches, each suffering from its respective disadvantages. First, vertical engine results pages (VERPs) that are specialized to a single information vertical, often search over collections of entities of a single type (e.g., movie entities) from an index containing basic entity attributes. Such solutions fail on queries that provide ambiguous descriptions or semantically relevant text that does not appear in the index (e.g., the query "movie with a sinking boat starring DiCaprio" may not return the movie "Titanic" or the query "Batman" may not return the movie "The Dark Knight.") The second general approach uses Web search, which has the advantage of a large index of related terms that exploits Web link structure and anchor text, includes powerful intent analysis, and uses auto-spell correction. A disadvantage of this approach is that rich content as offered by a VERP may not be surfaced at all if indexed pages are not resolved with entities. And even if rich content is retrieved, numerous results linking to instances of the same basic entity may be retrieved together, diluting the diversity of results, since indexed pages are not resolved to one another.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, integrating the advantages of vertical search and the advantages of Web search to provide a rich search experience utilizing entity-type characterization. A search query is received and an entity type is determined for the query. A Web search is then performed for the query against a predefined list of sources determined to be authoritative for the determined entity type. While a source may be authoritative for the entity type, it may also be include information for other entity types as well and, as such, identify results that relate to multiple entity types. Accordingly, the results of the source-specific searches are filtered based upon the entity type providing a filtered list of results that each pertains to an entity of the entity type determined to be associated with the query. The filtered list is then compared to a list of resolved entities to determine equivalent entities identified by different searched sources, the equivalent entities being combined into a single potential search result. The consolidated search results are then ordered based upon rank values. The rank value assigned to consolidated entities are aggregate rank values computed from individual rank values provided for the entity from the different sources. At least a portion of the results is then presented to the user.

BRIEF DESCRIPTION OF THE DRAWINGS

The present invention is illustrated by way of example and not limitation in the accompanying figures in which like reference numerals indicate similar elements and in which:

FIG. 3 is a schematic diagram showing an exemplary screen display of the results of a source-specific search, in accordance with an embodiment of the present invention;

FIG. 7 is a schematic diagram of a screen display illustrating an exemplary presentation of results of an integrated search conducted in accordance with an embodiment of the present invention;

FIGS. 8A and 8B are schematic diagrams of screen displays illustrating an exemplary presentation of faceted entity search, in accordance with an embodiment of the present invention;

DETAILED DESCRIPTION

Figure 1:
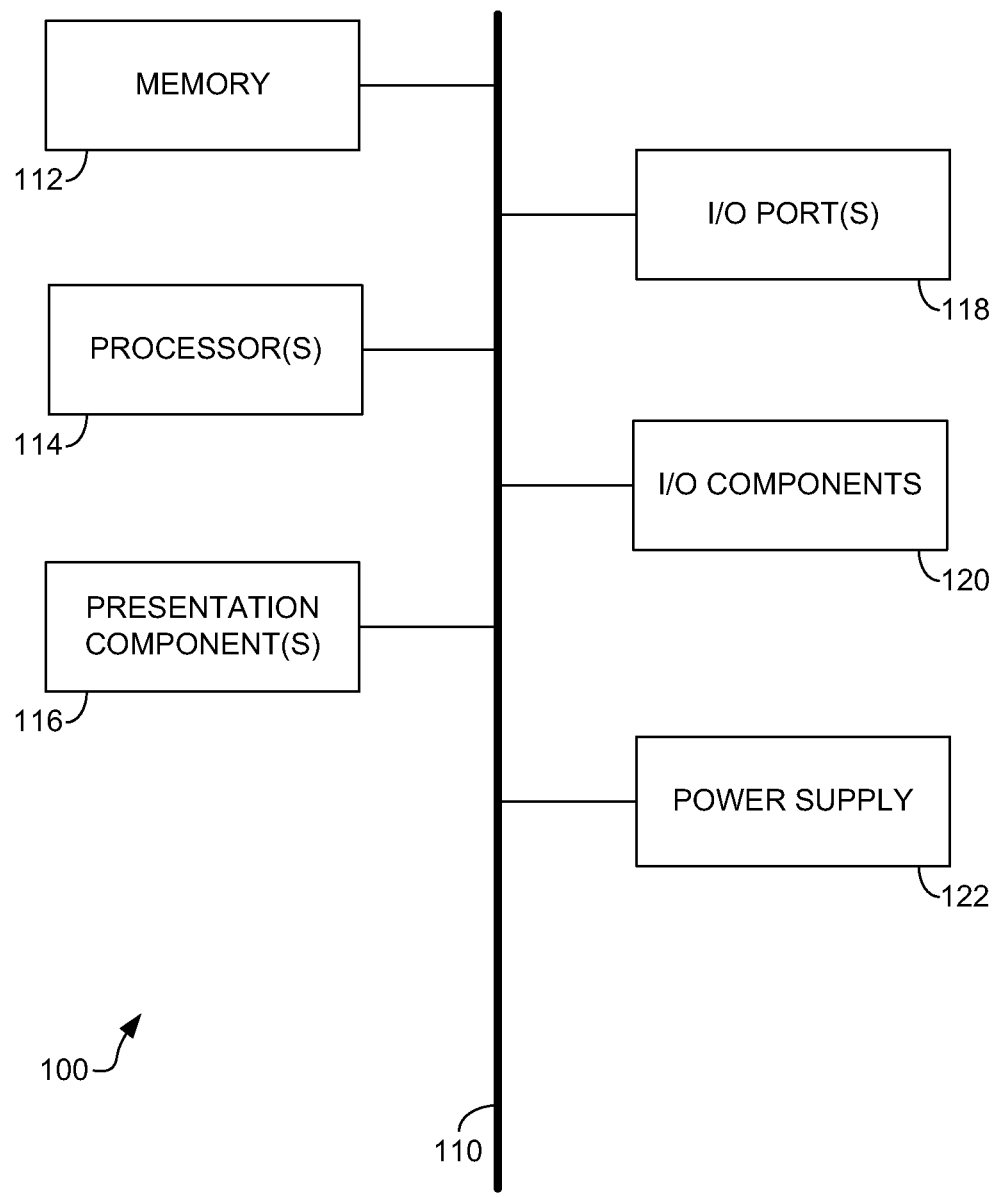
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, integrating the advantages of vertical search and the advantages of Web search to provide a rich search experience utilizing entity-type characterization. An "entity," in accordance with embodiments of the present invention, is a description of some sort of real word object or item. That is, an entity is a representation of a real world concept, as distinguished from a Web document. Rather than matching Web documents to terms appearing in search queries, embodiments of the present invention seek to match an entity or real world item (tangible or non-tangible) to the query such that a richer search experience may be provided, as more fully described below. Entities sharing common attributes may be grouped into entity types.

In accordance with embodiments hereof, a search query is received and an entity type is determined for the query. A Web search is then performed for the query against a predefined list of sources deemed to be authoritative for the determined entity type. While a source may be authoritative for the entity type, it also may include information for other entity types as well and, as such, identify results that relate to multiple entity types. Accordingly, the results of the source-specific searches are filtered based upon the entity type providing a filtered list of results that each pertains to an entity of the entity type determined to be associated with the query. The filtered list is then compared to a list of resolved entities to determine equivalent entities identified by different searched sources, the equivalent entities being combined into a single potential search result. The consolidated search results are then ordered based upon rank values. The rank value assigned to consolidated entities are aggregate rank values computed from individual rank values provided for the entity from the different sources. At least a portion of the results is then presented to the user.

Accordingly, one embodiment of the present invention is directed to one or more computer-readable storage media storing computer-useable instructions that, when used by one or more computing devices, cause the one or more computing devices to perform a method for targeting Web search based upon entity types and resolving results of the same. The method includes receiving a search query and determining at least one entity type for the received search query. The method further includes performing a Web search for the received search query, the Web search being restricted to a plurality of sources that have been identified for the at least one entity type. Still further, the method includes filtering results of the Web search to create a filtered list of search results, each search result in the filtered list of search results pertaining to an entity of the at least one entity type. Further, the method includes consolidating equivalent entities identified by different ones of the plurality of sources to create a consolidated list of search results, each search result in the consolidated list of search results pertaining to a different entity of the at least one entity type. Finally, the method includes ordering the consolidated list of search results based upon rank values, wherein a rank value assigned to at least one of the search results in the consolidated list of search results is an aggregate rank value computed from individual rank values provided for the entity associated with the at least one of the search results from at least a portion of the different ones of the plurality of sources.

In another embodiment, the present invention is directed to a method being performed by one or more computing devices including at least one processor, for targeting Web search based upon entity types and resolving results of the same. The method includes associating at least one entity type with a received search query, searching a plurality of predefined Web sources identified for the at least one entity type to determine a list of search results, and filtering the list of search results with regard to the at least one entity type to create a filtered list of search results. Each search result in the filtered list of search results pertains to an entity of the at least one entity type. The method further includes comparing the filtered list of search results to a resolved entity list to determine equivalent entities identified by different ones of the plurality of predefined sources, and creating a consolidated list of search results by consolidating the equivalent entities determined to have been identified by the different ones of the plurality of predefined sources. Each search result in the consolidated list of search results pertains to a different entity of the entity type. Still further, the method includes ordering the consolidated list of search results based upon rank values, wherein a rank value assigned to at least one of the search results in the consolidated list of search results is an aggregate rank value computed from individual rank values provided for the entity associated with the at least one of the search results, the individual rank values being provided by at least a portion of the different ones of the plurality of predefined sources.

In yet another embodiment, the present invention is directed to a system for targeting Web search based upon entity type. The system includes a computing device associated with a search engine having one or more processors and one or more computer-readable storage media and a data store coupled with the search engine. The search engine is configured to receive a search query, determine at least one entity type for the received search query, identify a plurality of authoritative sources associated with the at least one entity type, search the plurality of identified authoritative sources to determine a list of search results, and filter the list of search results to create a filtered list of search results. Each search result in the filtered list of search results pertains to an entity of the at least one entity type. The search engine is further configured to compare the filtered list of search results to a resolved entity list to determine equivalent entities identified by different ones of the plurality of authoritative sources, and create a consolidated list of search results by consolidating the equivalent entities determined to have been identified by the different ones of the plurality of authoritative sources. Each search result in the consolidated list of search results pertains to a different entity of the entity type. The search engine is further configured to order the consolidated list of search results based upon rank values, wherein a rank value assigned to at least one of the search results in the consolidated list of search results is an aggregate rank value computed from individual rank values provided for the entity associated with the at least one of the search results, the individual rank values being provided by at least a portion of the different ones of the plurality of authoritative sources.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention are generally directed to systems, methods, and computer-readable storage media for, among other things, integrating the advantages of vertical search and the advantages of Web search to provide a rich search experience utilizing entity-type characterization. A search query is received and an entity type is determined for the query. A Web search is then performed for the query against a predefined list of sources determined to be authoritative for the determined entity type. While a source may be authoritative for the entity type, it also may include information for other entity types as well and, as such, identify results that relate to multiple entity types. Accordingly, the results of the source-specific searches are filtered based upon the entity type providing a filtered list of results that each pertains to an entity of the entity type determined to be associated with the query. The filtered list is then compared to a list of resolved entities to determine equivalent entities identified by different searched sources, the equivalent entities being combined into a single potential search result. The consolidated search results are then ordered based upon rank values. The rank value assigned to consolidated entities are aggregate rank values computed from individual rank values provided for the entity from the different sources. At least a portion of the results is then presented to the user.

Figure 2:
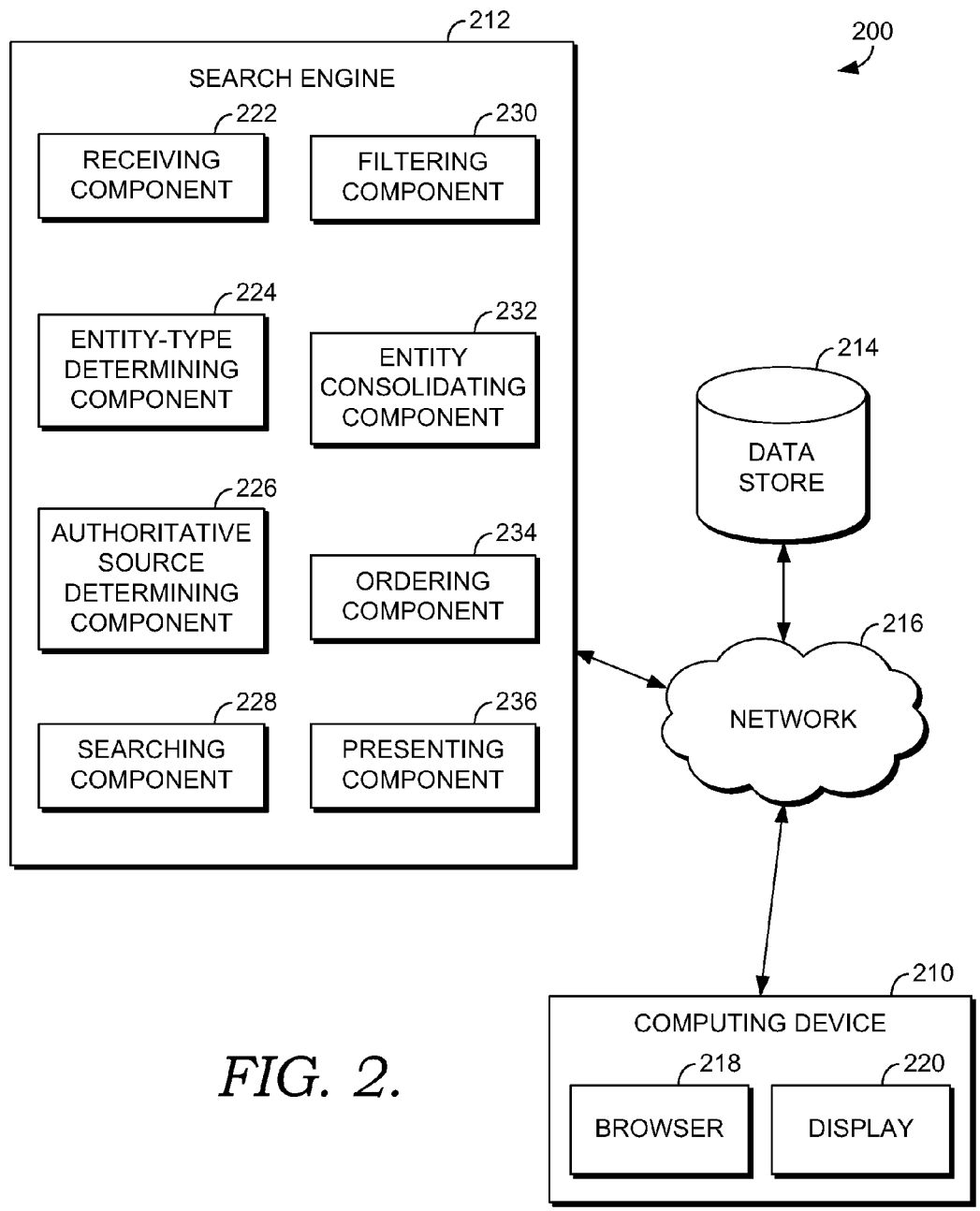
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which targeted Web searches may be conducted based upon entity types determined for an input search query and the results thereof resolved. Among other components not shown, the computing system 200 generally includes a user computing device 210, a search engine 212, and a data store 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of user computing devices and search engines may be employed in the computing system 200 within the scope of embodiments of the present invention. Each may comprise a single device/ interface or multiple devices/interfaces cooperating in a distributed environment. For instance, the search engine 212 may comprise multiple devices and/or modules arranged in a distributed environment that collectively provide the functionality of the search engine 212 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the user computing device 210, as an Internet-based service, or as a module inside the search engine 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines or user computing devices. By way of example only, the search engine 212 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 210 may include any type of computing device, such as the computing device 100 described with reference to FIG. 1, for example. Generally, the client computing device 210 includes a browser 218 and a display 220. The browser 218, among other things, is configured to render search engine home pages (or other online landing pages), and render search engine results pages in association with the display 220 of the client computing device 210. The browser 218 is further configured to receive user input of requests for various web pages (including search engine home pages), receive user inputted search queries (generally inputted via a user interface presented on the display 220 and permitting alpha-numeric and/or textual input into a designated search box) and to receive content for presentation on the display 220, for instance, from the search engine 212. It should be noted that the functionality described herein as being performed by the browser 218 may be performed by any other application capable of rendering Web content. Any and all such variations, and any combination thereof, are contemplated to be within the scope of embodiments of the present invention.

The search engine 212 is configured to receive and respond to requests that it receives from components associated with user computing devices, for instance, the browser 218 associated with the client computing device 210. Those skilled in the art of the present invention will recognize that the present invention may be implemented with any number of searching utilities. For example, an Internet search engine or a database search engine may utilize the present invention. These search engines are well known in the art, and commercially available engines share many similar processes not further described herein.

As illustrated, the search engine 212 includes a query receiving component 222, an entity type determining component 224, an authoritative source determining component 226, a searching component 228, a filtering component 230, an entity consolidating component 232, an ordering component 234 and a presenting component 236. The illustrated search engine 212 also has access to a data store 214. The data store 214 is configured to store information pertaining to search queries, entities and authoritative sources. In various embodiments, such information may include, without limitation, search query logs, an index of entity types and corresponding entities, an index or other listing of sources determined to be authoritative with respect to the indexed entity types, and a list of resolved entities. In embodiments, the data store 214 is configured to be searchable for one or more of the items stored in association therewith. It will be understood and appreciated by those of ordinary skill in the art that the information stored in association with the data store 214 may be configurable and may include any information relevant to search queries, entity types and corresponding entities, and searchable sources. The content and volume of such information are not intended to limit the scope of embodiments of the present invention in any way. Further, though illustrated as a single, independent component, the data store 214 may, in fact, be a plurality of storage devices, for instance a database cluster, portions of which may reside in association with the search engine 212, the client computing device 210, another external computing device (not shown), and/or any combination thereof.

The query receiving component 222 of the search engine 212 is configured to receive requests for presentation of search results that satisfy an input search query. Typically, such a request is received via a browser associated with a client computing device, for instance, the browser 218 associated with the client computing device 210. In embodiments, a search query may also be implicitly invoked and received by the query receiving component 222, for instance, by a user pointing to something (e.g., on a screen, a television set, or in the physical world); moving a mouse pointer to an icon/text; speaking with someone on the phone; sending an SMS, tweet, or status update; or by other means. That is, embodiments of the present invention are not limited to users inputting a search query into a traditional query-input region of a screen display.

The entity type determining component 224 is configured to determine at least one entity type relevant to a received search query. Standard techniques of query understanding can be used to map query intent to one or more entity types. For example, static and dynamic relevance scores can be obtained for entity types, through static content within data relevant to each type. Such content may include, by way of example only, text in a database of the relevant entities, unstructured Web pages on the relevant entities and the link structure of the Web restricted to those Web pages, and training classifiers to determine when features of a query string match features of the entity type and its corresponding entities. Entity types may also be implicitly determined from context, for instance, by actions of the user such as the user pointing to something (e.g., on a screen, a television set, or in the physical world); moving a mouse pointer to an icon/text; speaking with someone on the phone; sending an SMS, tweet, or status update; or by other means. Any and all such variations, and any combination thereof, are contemplated to be within the scope of embodiments of the present invention.

If it is determined by the entity type determining component 224 that more than one entity type is relevant to an input search query, then the results of the subsequent entity searches may be flattened into a single search results page with entities of each type interleaved/mixed in some way. Alternatively, an interface for faceted search can be presented, in which the user can narrow the search down to suggested entity type(s); effectively filtering out the results of some of the subsequent entity searches from the final results. This is more fully described below with respect to FIGS. 8A and 8B. Any and all such variations, and any combination thereof, are contemplated to be within the scope of embodiments of the present invention.

The authoritative source determining component 226 is configured to identify a plurality of sources predetermined to be authoritative for given entity types. Authoritative sources are a subset of all crawled sources or sources available from subscribed structured feeds for an entity type. These sources may be specific to a regional market but they could also be global. As an illustrative example, movie sources specific to the US market could include IMDB, ROVI/AMG, NETFLIX, HULU, YAHOO! REVIEWS, FLIXTER, and METACRITIC. Of these, the authoritative sources may be identified as IMDB (i.e., www.imdb.com), ROVI (i.e., www.Allrovi.com), and NETFLIX (i.e., www.netflix.com).

The choice of which sources are authoritative can depend on many factors. On one extreme, all sources could be authoritative. On the other, only one. In general, good authoritative sources are those that will yield results on a source-specific Web search. For example, a source not indexed by the Web search engine may not be a good candidate for an authoritative source. And a very good authoritative source candidate may be one that is linked to from many other websites, has rich anchor text, and has rich meta-data on the source site indexed by the Web search engine.

Given a user's query having an intent that has been matched with a particular entity type, the searching component 228 is configured to perform a Web search on each authoritative source site by using a Web search engine (for instance, the commonly known commercial search engine BING provided by Microsoft Corporation of Redmond, Wash.) to execute a source-specific search against the input search query. For example, searching for movie entities that match a query "in space no one can hear you scream," the searching component 228 may issue queries using BING as follows:

On IMDB: http://www.bing.com/search?q=site %3Awww.imdb.com+in+space+no+one+can+hear+you+scream.

On NETFLIX: http://www.bing.com/search?q=site %3Awww.netflix.com+in+space+no+one+can+hear+you+scream.

On ROVI: http://www.bing.com/search?q=site %3Awww. allrovi.com+in+space+no+one+can+hear+you+scream. FIG. 3 is a schematic diagram showing an exemplary screen display 300 of this source-specific search. As desired, the movie "Alien" is surfaced because the quote from the movie, comprising the user query in this example, is either contained in the rich unstructured text on the ALLROVI website or because a hyperlink pointing to the ROVI "Alien" webpage has this quote as anchor text. A similar search can be issued to any major search engine through a similar HTTP POST request, or via an alternate API surfaced by the Web search engine. The results of the source-specific Web searches are lists of documents deemed somehow relevant to the query by the queried Web search engine. Depending on what information is made available by the Web search engine, the engine's internal relevance scores may also be returned for each listed document.

Figure 4:
FIG. 4 is a schematic diagram showing an exemplary screen display demonstrating why filtering is sometimes deemed necessary when entity search is conducted in accordance with embodiments of the present invention.

The filtering component 230 is configured to filter each list of documents returned by the authoritative source-specific Web searches, and keep only URLs potentially related to the entity type of interest. FIG. 4 is a schematic diagram showing an exemplary screen display 400 demonstrating why filtering is sometimes deemed necessary. In the illustrated example, the authoritative source website contains many pages that are not directly relevant to the entity type (in this example, the entity type "movies"). Any one of a number of methods may be used to filter out irrelevant pages. The following are intended to be illustrative and not restrictive of embodiments of the present invention. Regular expression URL patterns may be manually determined for each entity type and authoritative source. Source-specific search results that match the pattern will remain unfiltered while URLs that do not match the pattern will be filtered out. Moreover, the pattern may specify where the source's own internal entity idea is represented which can be used to identify the source's presentation of the entity in the entity consolidation/resolution step, more fully described below with reference to the entity consolidating component 232. Example patterns for IMDB and NETFLIX include:

IMDB pattern: www.imdb.com/title/{ID starting with tt}.
NETFLIX pattern: www.netflix.com/Movie/{string}/{numeric id}.

These URL patterns also could be automatically extracted given a set of example documents from an authoritative source web site that are relevant to a given entity type. The entity search engine 212 may instead surface an API through which source websites and feeds submit URL patterns. Or, the relevance of Web pages to particular entity types, along with internal source IDs, could be embedded on those pages using a predefined standard. Any and all such variations, and any combination thereof, are contemplated to be within the scope of embodiments of the present invention.

If the internal data source IDs are not available from the pages surfaced in the source-specific searches, then entity resolution can be used to match those page results to entities from the data sources. Entity resolution is more fully described below with reference to the entity consolidating component 232. This additional application of entity resolution, described here, can provide the mapping between surfaced URLs and internal IDs, thus enabling filtering by the entity consolidating component 232.

The entity consolidating component 232 is configured to run all sources for an entity type through an entity resolution pipeline and to compare the results of entity resolution with the filtered source-specific results. Given collections of entities from multiple sources, entity resolution represents, at a high-level, a two-step process that resolves equivalent entities between sources and then merges sets of equivalent entities into single, richer representations of the underlying entities. Initially, only entity resolution is necessary. Merging is required later for the final step of the methods described herein where a single merged representation of a query-relevant entity is surfaced by the entity search, as more fully described below. Resolution and merging make use of features or attributes of entities. Examples for the entity type "movies" include title, release year, director(s), cast, runtime, studio, genre(s), and the like. For the entity type "people," features or attributes could include name, birthdate/age, gender, occupation, geographic location, home address, phone number, and other personally identifying information. Entities of the same entity type from different sources are compared on their attributes, eventually resulting into sets of matching entities. Merging takes these sets of matching entities and for each produces a prototypical entity by merging and combining the member entities' individual attributes.

The results of entity resolution are combined with the results of the filtered, source-specific searches. Since the source-specific searches are run on sources of entity data that have been run through entity resolution, the search engine 212 can group documents retrieved by search that are known to be relevant entities (due to the filtering component 230) and that have been matched with all other known representations of the same entities (using the results of entity resolution). In this way, the search engine 212 groups the entity-related documents from filtered source-specific searches that are the same. The linking from source-specific search to entity resolution results is accomplished by using source-internal entity IDs, as described above.

Each authoritative source is assigned a quality coefficient Q. The coefficient is based on the total number of entities in the source that could be surfaced during a Web search. The results of this step are sets of URLs that are relevant to the user-submitted query, that represent the same entity that is of the entity type of interest (as represented by the input search query). For example, the following two URLs may comprise one of these result sets for the Batman 1989 movie:

www.imdb.com/title/tt0096895.
www.netflix.com/Movie/Batman/287290.

The ordering component 234 is configured to order the sets of equivalent or like entities extracted from entity resolution and the filtered source-specific Web searches. Number of approaches can be followed to produce such a ranking. Two primary sources of signals are extracted for ranking. The first are the rankings (and optionally the relevance scores returned by the Web search engine, if any) of the documents from the source-specific Web searches. Without relevance scores, these search results produce ranks for each filtered document (e.g., the first document could be assigned rank one, the second rank two, etc.). If available, the relevance scores can be assigned to the returned documents. The second source of signals for use in ranking relevant sets of equivalent entities can come from applying standard database search for the query string in the data sources input into entity resolution. For instance, the query string can be parsed into words and these keywords matched against the entities' attributes. Additional sources of signals may also be available, depending on the data available to the entity search engine. For example, there may be popularity information such as user ratings which are used for collaborative filtering for recommendations. Another example could be historical click-through data on the merged entities surfaced by the entity search engine in the past. Along similar lines, toolbar data from the authoritative sites may be used for general Web search ranking, but may be more relevant for entity search, so that by including them as signal in entity search, they may receive higher weighting than they receive for their contribution to source-specific relevance scores.

A rank or relevance score combining step is then applied to the set of source-specific search ranks, search-specific search relevance scores, attribute-based search relevance scores and other sources of relevance signals. Essentially, such a step combines multiple relevance scores from these many individual rankings, as features for a meta-ranking of the grouped entities. The result of this step, then, is a ranking on distinct entities which have been grouped over the individual source-specific searches by entity resolution.

The presenting component 236 is configured to present at least a portion of the ordered list of entities relevant to the user-submitted query. Merging from entity resolution can be used to merge attributes of the individual representations of entities from across different crawled/indexed/subscribed-to sources. Artwork/images, meta-data, entity actions, and even entity-specific advertising can be surfaced in a natural and consistent way by the entity search system, as illustrated in the screen display 700 of FIG. 7, more fully described below.

Additionally, the search engine 212 may employ faceted search to suggest to users how their search results may be narrowed or further refined. For example, if multiple entity types are surfaced in an integrated search results page, the user may be offered a choice to deselect types (e.g., keeping restaurants but removing cafes from results). At a more fine-grained level, facets may be presented within a single entity type. For example, if the user is presented with movie results, the search engine 212 may allow the user to specify genre (e.g., science fiction) and release year range (e.g., movies released after 2000). One embodiment for presentation of faceted search is shown in the screen displays of FIGS. 8A and 8B, more fully described below.

Figure 5:
FIG. 5 is a schematic diagram showing an exemplary screen display of an entity search conducted in accordance with an embodiment of the present invention.

Turning now to FIG. 5, shown is an exemplary screen display 500 illustrating an entity search example in accordance with embodiments of the present invention for the input search query "James Bond." Initially, the entity type has been identified as "movies." Thus, in this illustrated embodiment, it can be presumed the user desires to find a movie in the James Bond franchise, e.g., on NETFLIX, but does not know the movie title. Even though the input query string (i.e., "James Bond") is not included in any of the movie titles ultimately surfaced (and may not belong to other attributes for the desired movie on NETFLIX), the resultant movies are surfaced because the query string may appear in anchor text linking to NETFLIX, or potentially in another source that is resolved against NETFLIX and is being indexed by the search engine (for instance, blog text with a comment "Diamonds are Forever is my favorite James Bond movie"). Moreover, by performing an integrated entity search in accordance with embodiments of the present invention, the search engine (e.g., the search engine 212 of FIG. 2) can surface meta-data about relevant entities. Note that to the right of the surfaced movie entities is a plurality of selectable icons representing authoritative sources and/or entity actions (for instance, buying tickets, streaming, renting, and the like). The user may select, for instance, the NETFLIX icon and be navigated to the NETFLIX version of the corresponding James Bond movie in accordance with the exemplary intent.

Figure 6:
FIG. 6 is a schematic diagram showing an exemplary screen display of another entity search conducted in accordance with an embodiment of the present invention.

With reference to FIG. 6, shown is an exemplary screen display 600 illustrating another entity search example in accordance with an embodiment of the present invention, this time for the input search query "Neo and Trinity." Again, the entity type has been identified as "movies." As illustrated, the user is looking for one of the movies in the Matrix trilogy but does not remember the movies' names, just the names of two main characters. By integrating source-specific searches on sites that includes the cast and the characters that they play, critic and fan reviews, plots, etc., a search engine performing entity search in accordance with embodiments hereof is able to retrieve the desired entities. Note that the character names "Neo" and "Trinity" are unlikely to have appeared in synopses of the movies that are associated with traditionally searched sources.

With reference to FIG. 7, a screen display 700 illustrating an exemplary presentation of results of an integrated search conducted in accordance with embodiments of the present invention is shown. In the illustrated example, the user query is for the movie quote "there can be only one" from the movie Highlander. Note how the merged results of entity resolution and source-specific search are displayed in a consistent fashion. Each movie entity is displayed with artwork, title, and meta-data. Different sources of data that provide entity actions (such as rent, stream, read reviews, buy, and the like.) are surfaced with a consistent interface of vertically stacked icons on the right-hand side. Note also that only documents that are in the desired entity type are surfaced (due to source-specific search and filtering) and how there is only one result per distinct entity (due to entity resolution and consolidation).

Figure 8A:
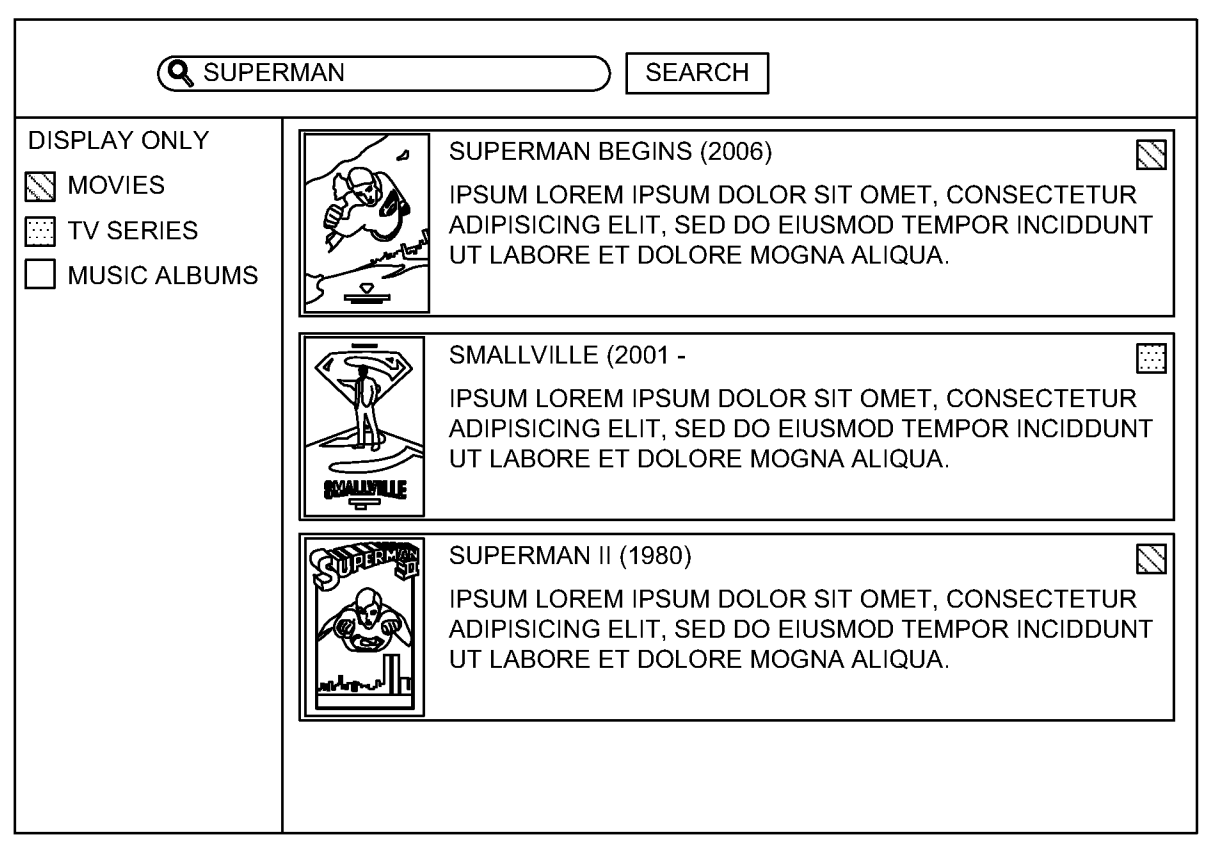
Figure 8B:
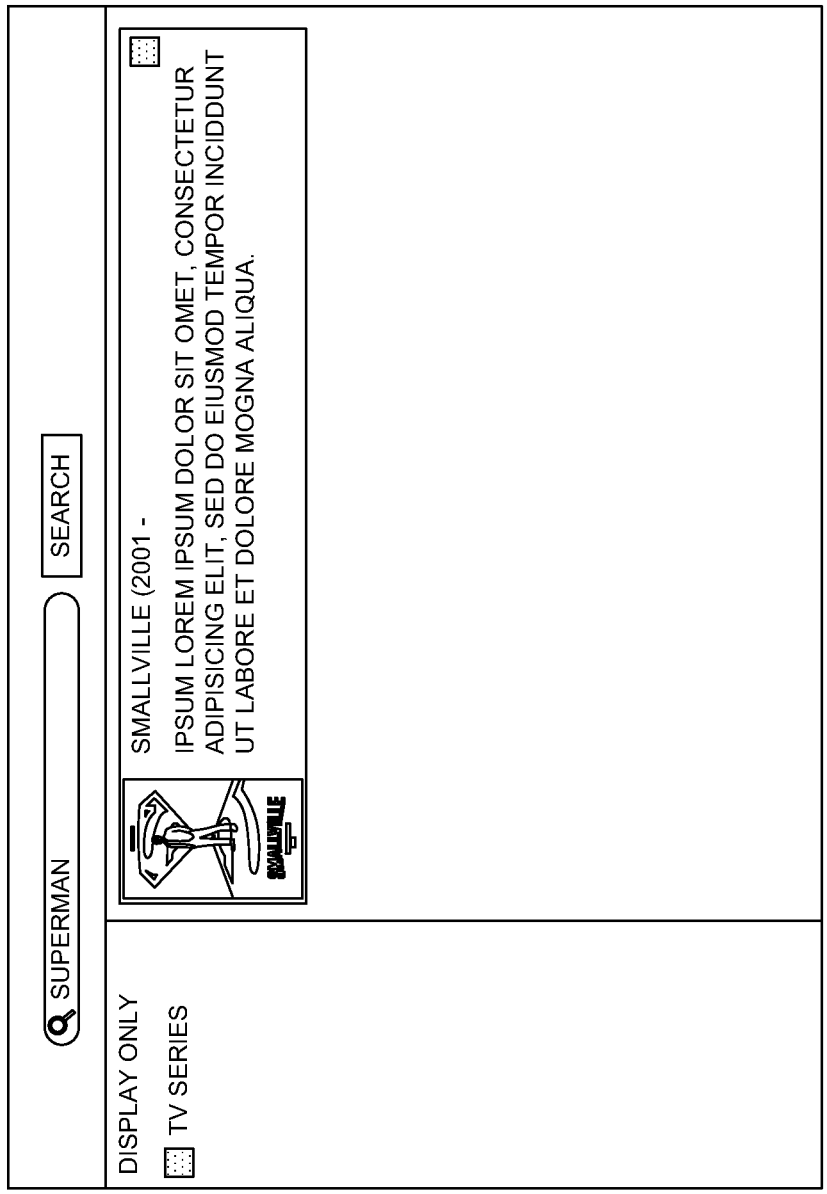

With reference to FIGS. 8A and 8B, screen displays illustrating faceted entity search are shown, in accordance with embodiments of the present invention. For an initial search (FIG. 8A), multiple types of entities potentially map to the input search query (i.e., "Superman"). In the illustrated example, "Superman" can refer to any of the entertainment entity types "Movies," "TV Series," or "Songs." In the illustrated screen display of FIG. 8A, the user is able to select a facet and narrow the nature of the displayed entities by doing so. For instance, FIG. 8B represents a user selection of the entity type "TV Series."

Figure 9:
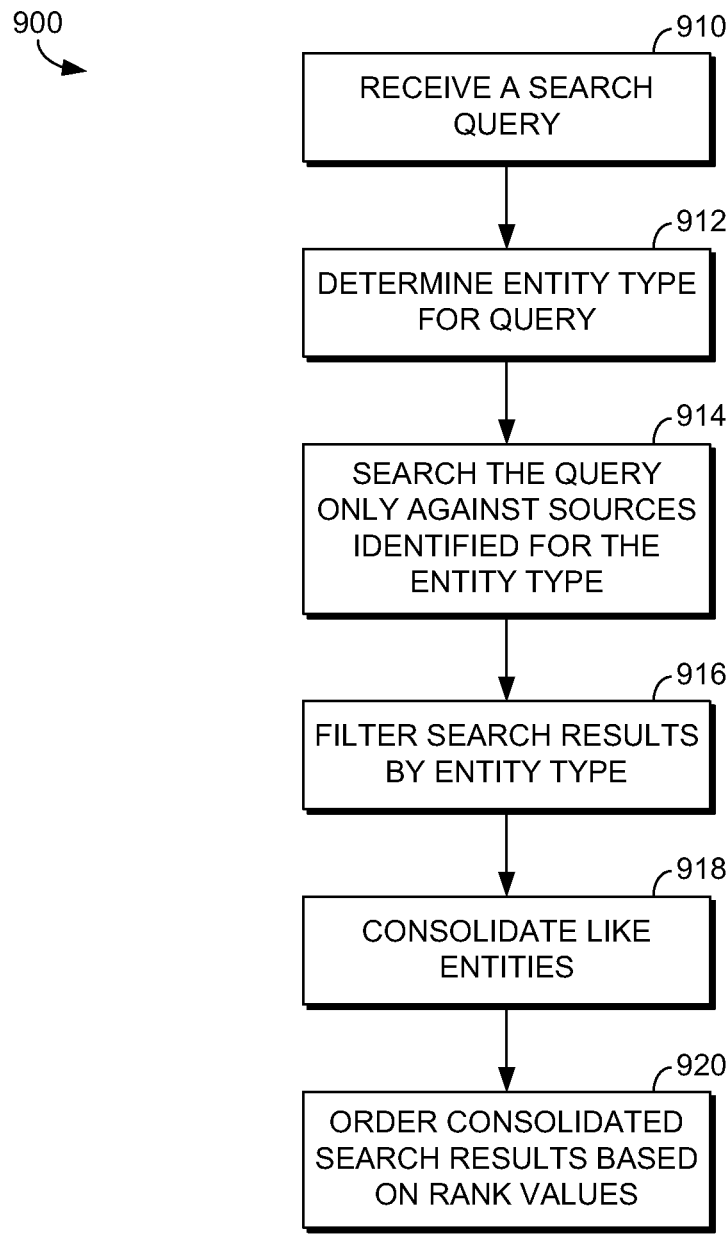
FIG. 9 is a flow diagram showing an exemplary method for targeting Web search based upon entity types and resolving the results thereof, in accordance with an embodiment of the present invention.

Turning now to FIG. 9, a flow diagram is illustrated showing an exemplary method 900 for targeting Web search based upon entity types and resolving the results thereof, in accordance with an embodiment of the present invention. Initially, as indicated at block 910, a search query is received, for instance, by query receiving component 222 of the search engine 212 of FIG. 2. As indicated at block 912, at least one entity type is determined for the received search query. This may be done, for instance, utilizing entity-type determining component 224 of the search engine 212 of FIG. 2. A Web search is performed for the received search query, as indicated at block 914 (e.g., utilizing searching component 228 of FIG. 2). The Web search is restricted to a plurality of sources that have been identified as authoritative for the at least one entity type determined for the received search query. As indicated at block 916, the results of the Web search are filtered to create a filtered list of search results (for instance, utilizing filtering component 230 of FIG. 2). Each search result in the filtered list of search results pertains to an entity of the at least one entity type determined for the received search query. Equivalent entities identified by different ones of the plurality of sources are consolidated, as indicated at block 918, to create a consolidated list of search results. This may be done, for instance, utilizing entity consolidating component 232 of FIG. 2. Each search result in the consolidated list of search results pertains to a different entity of the at least one entity type determined for the received search query. As indicated at block 920, the consolidated list of search results is ordered for presentation based upon rank values, e.g., utilizing ordering component 234 of FIG. 2. Rank values assigned to search results in the consolidated list of search results representing equivalent entities are aggregate rank values computed from individual rank values provided for the entity from at least a portion of the different ones of the plurality of sources.

Figure 10:
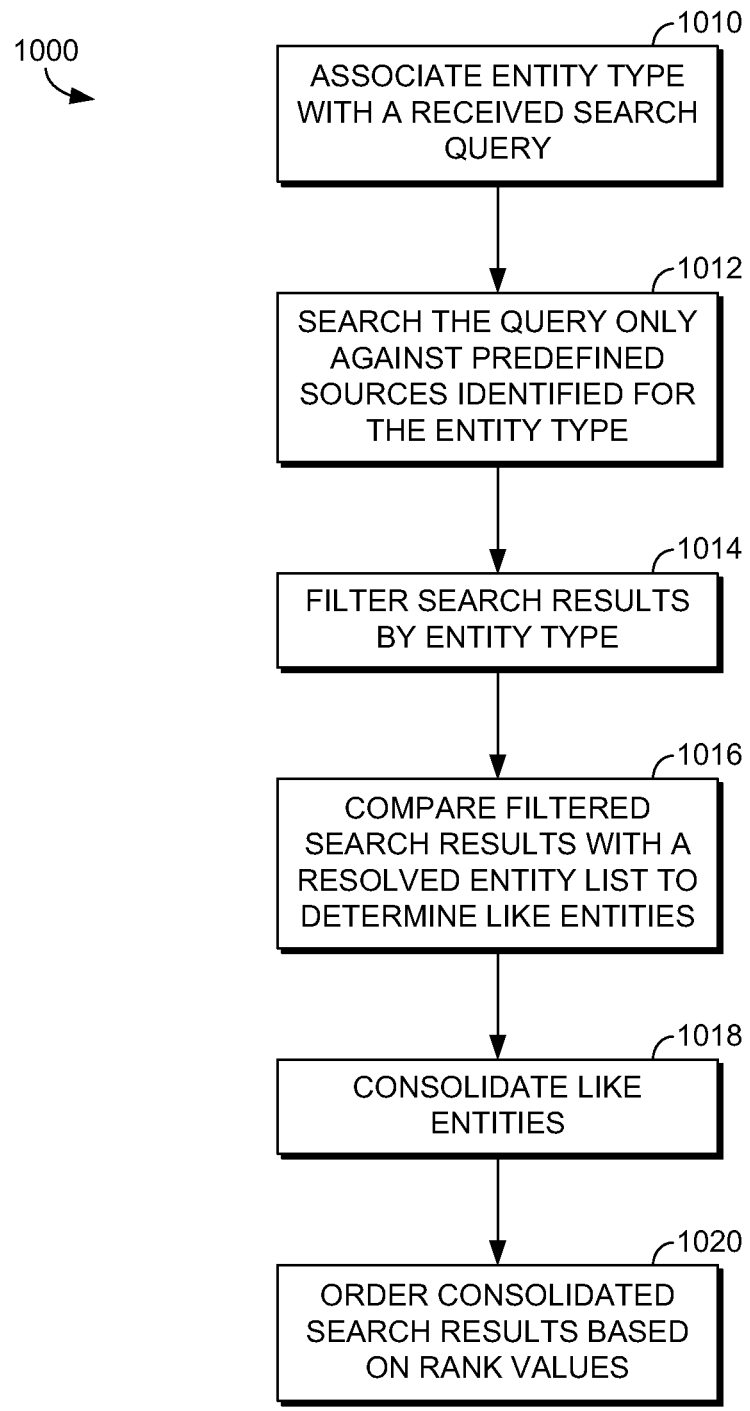
FIG. 10 is a flow diagram showing another exemplary method for targeting Web search based upon entity types and resolving the results thereof, in accordance with an embodiment of the present invention.

With reference to FIG. 10, a flow diagram is illustrated showing another exemplary method 1000 for targeting Web search based upon entity types and resolving the results thereof, in accordance with an embodiment of the present invention. Initially, as indicated at block 1010, at least one entity type is associated with a received search query, for instance, utilizing entity-type determining component 224 of the search engine 212 of FIG. 2. As indicated at block 1012, a plurality of predefined Web sources identified as authoritative for the at least one entity type is searched to determine a list of search results (e.g., utilizing searching component 228 of FIG. 2). As indicated at block 1014, the results of the search are filtered with regard to the at least one entity type to create a filtered list of search results (for instance, utilizing filtering component 230 of FIG. 2). Each search result in the filtered list of search results pertains to an entity of the at least one entity type determined for the received search query. As indicated at block 1016, the filtered list of search results is then compared to a resolved entity list to determine equivalent entities identified by different ones of the plurality of predefined sources. Equivalent entities determined to have been identified by different ones of the plurality of sources are consolidated, as indicated at block 1018, to create a consolidated list of search results. This may be done, for instance, utilizing entity consolidating component 232 of FIG. 2. Each search result in the consolidated list of search results pertains to a different entity of the at least one entity type determined for the received search query. As indicated at block 1020, the consolidated list of search results is ordered for presentation based upon rank values, e.g., utilizing ordering component 234 of FIG. 2. Rank values assigned to search results in the consolidated list of search results representing equivalent entities are aggregate rank values computed from individual rank values provided for the entity from at least a portion of the different ones of the plurality of sources.

As can be understood, embodiments of the present invention provide systems and methods for integrating the advantages of vertical search and the advantages of Web search to provide a rich search experience utilizing entity-type characterization. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 900 of FIG. 9 and 1000 of FIG. 10 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer storage media storing computer-useable instructions that, when used by one or more computing devices, cause the one or more computing devices to perform a method for targeting search based upon entity types and resolving results of the search, the method comprising:

receiving a search query;

identifying at least one entity associated with the search query;

determining at least one entity type relevant to the at least one entity associated with the received search query, wherein the entity type represents at least one common attribute shared by the at least one entity and one or more other entities;

identifying a plurality of authoritative sources, the authoritative sources comprising Web sources determined to be authoritative for the at least one entity type determined to be relevant to the received search query;

performing a search of each of the authoritative sources for the received search query to identify search results relevant to the received search query, wherein the search results are compiled into source-specific search result lists for each of the authoritative sources;

for the each of the authoritative sources, filtering each source-specific search result lists for each of the authoritative sources based on the entity type determined to be relevant to the received search query to create a filtered list of search results for each of the authoritative sources, each search result in the filtered list of search results relevant to the received search query and pertaining to a particular entity associated with the at least one entity type determined to be relevant to the received search query;

consolidating equivalent entities across each of the filtered lists for each of the authoritative sources to generate a plurality of sets of equivalent entities, each set of equivalent entities relevant to the received search query and pertaining to a different particular entity associated with the at least one entity type determined to be relevant to the received search query;

ordering the sets of equivalent entities based upon rank values, wherein a rank value assigned to at least one of the sets of equivalent entities is an aggregate rank value computed from individual rank values provided for the particular entity pertaining to the at least one set by at least a portion of the authoritative sources;

providing at least a portion of the sets of equivalent entities, wherein information associated with at least one of the presented sets of equivalent entities is derived from multiple ones of the authoritative sources; and providing one or more indicators corresponding to at least a portion of the multiple ones of the authoritative sources from which the information associated with the at least a portion of the sets of equivalent entities is derived.

2. The one or more computer storage media of claim 1, wherein filtering the search results to create the filtered list of search results comprises filtering the search results, at least in part, utilizing Uniform Resource Locator patterning.

3. The one or more computer storage media of claim 1, wherein consolidating the equivalent entities across the each of the filtered lists comprises comparing the each of the filtered lists to a resolved entity list to determine the equivalent entities.

4. The one or more computer storage media of claim 1, wherein the information derived from at least one of the multiple ones of the authoritative sources is not presented in association with the at least a portion of the sets of equivalent entities provided.

5. The one or more computer storage media of claim 1, wherein at least a portion of the one or more indicators corresponding to the at least a portion of the multiple ones of the authoritative sources is selectable.

6. A method being performed by one or more computing devices including at least one processor, for targeting search based upon entity types and resolving results of the search, the method comprising:

receiving a search query;

identifying at least one entity associated with the search query;

determining at least one entity type relevant to the at least one entity associated with the received search query, wherein the entity type represents at least one common attribute shared by the at least one entity and one or more other entities;

identifying a plurality of authoritative sources, the authoritative sources comprising Web sources determined to be authoritative for the at least one entity type associated with the received search query, the authoritative sources comprising one or more of a subset of crawled Web sources or subscribed structured feeds relevant to the at least one entity type associated with the received search query;

using the received search query, searching each of the authoritative sources to identify a list of search results relevant to the received search query for each of the authoritative sources;

for each of the authoritative sources, filtering each list of search results for each of the authoritative sources based on the at least one entity type associated with the received search query to create a filtered list of search results for each of the authoritative sources, each search result in the filtered list of search results relevant to the received search query and pertaining to a particular entity associated with the at least one entity type;

comparing, using the one or more computing devices, each of the filtered lists of search results for each of the authoritative sources to a resolved entity list to determine equivalent entities across the each of the filtered lists of search results;

creating a consolidated list of search results by consolidating the equivalent entities determined across the each of the filtered lists of search results, each search result in the consolidated list of search results relevant to the received search query and pertaining to a different particular entity associated with the at least one entity type associated with the received search query;

ordering the consolidated list of search results based upon rank values, wherein a rank value assigned to at least one of the search results in the consolidated list of search results is an aggregate rank value computed from individual rank values provided for the particular entity pertaining to the at least one of the search results by at least a portion of the authoritative sources;

providing at least a portion of the ordered list of search results, wherein information associated with at least one search result of the provided portion of the ordered list of search results is derived from multiple ones of the authoritative sources, and wherein one or more indicators corresponding to at least a portion of the multiple ones of the authoritative sources is provided.

7. The method of claim 6, wherein filtering the search results based on the at least one entity type associated with the received search query to create the filtered list of search results comprises filtering the search results, at least in part, utilizing Uniform Resource Locator patterning.

8. The method of claim 6, wherein the information derived from at least one of the multiple ones of the authoritative sources is not provided.

9. The method of claim 6, wherein at least a portion of the one or more indicators is selectable.

10. A system for targeting search based upon entity type and resolving results of the search, the system comprising:
   a computing device associated with a search engine having one or more processors and one or more computer-readable storage media; and
   a data store coupled with the search engine, wherein the search engine:
      receives a search query;
      identifies at least one entity associated with the search query;
      determines at least one entity type relevant to the at least one entity associated with the received search query, wherein the at least one entity type represents at least one common attribute shared by the at least one entity and one or more other entities;
      identifies a plurality of authoritative sources, the authoritative sources comprising Web sources that have been determined to be authoritative for the at least one entity type determined to be relevant to the received search query the authoritative sources comprising one or more of a subset of Web sources crawled by the search engine or structured feeds relevant to the at least one entity type subscribed to by the search engine;
      searches each of the authoritative sources to determine a list of search results relevant to the received search query;
      for each of the authoritative sources, filters the list of search results based on the entity type determined to be relevant to the received search query to create a filtered list of search results, each search result in the filtered list of search results relevant to the received search query and pertaining to a particular entity associated with the at least one entity type;
      compares each of the filtered lists of search results to a resolved entity list to determine equivalent entities across the each of the filtered lists of search results;
      creates a consolidated list of search results by consolidating the equivalent entities determined across the each of the filtered lists of search results, each search result in the consolidated list of search results relevant to the received search query and pertaining to a different particular entity associated with the at least one entity type determined to be relevant to the received search query;
      orders the consolidated list of search results based upon rank values, wherein a rank value assigned to at least one of the search results in the consolidated list of search results is an aggregate rank value computed from individual rank values provided for the particular entity pertaining to the at least one of the search results by at least a portion of the authoritative sources; and
      providing at least a portion of the ordered list of search results, wherein each search result pertains to a different entity, and wherein at least one search result is associated with one or more selectable indicators corresponding to each authoritative source from which the at least one search result is derived,
      wherein information associated with the at least one search result of the presented portion of the ordered list of search results is derived from multiple ones of the authoritative sources.

11. The system of claim 10, wherein the information derived from at least one of the multiple ones of the authoritative sources is not presented.

* * * * *